United States Patent
Muthiah et al.

(10) Patent No.: US 11,513,963 B2
(45) Date of Patent: Nov. 29, 2022

(54) DATA STORAGE DEVICE AND METHOD FOR APPLICATION IDENTIFIER HANDLER HEADS-UP FOR FASTER STORAGE RESPONSE

(71) Applicant: Western Digital Technologies, Inc., San Jose, CA (US)

(72) Inventors: Ramanathan Muthiah, Bangalore (IN); Akhilesh Yadav, Bengaluru (IN)

(73) Assignee: Western Digital Technologies. Inc., San Jose, CA (US)

( * ) Notice: Subject to any disclaimer, the term of this patent is extended or adjusted under 35 U.S.C. 154(b) by 0 days.

(21) Appl. No.: 17/198,534

(22) Filed: Mar. 11, 2021

(65) Prior Publication Data
US 2022/0292020 A1    Sep. 15, 2022

(51) Int. Cl.
*G06F 12/00* (2006.01)
*G06F 12/0875* (2016.01)
*G06F 12/1009* (2016.01)

(52) U.S. Cl.
CPC ...... *G06F 12/0875* (2013.01); *G06F 12/1009* (2013.01); *G06F 2212/657* (2013.01)

(58) Field of Classification Search
CPC ............. G06F 12/0875; G06F 12/1009; G06F 2212/657
See application file for complete search history.

(56) References Cited

U.S. PATENT DOCUMENTS

| | | | | |
|---|---|---|---|---|
| 7,028,299 | B1* | 4/2006 | Chang | G06F 9/4881 718/107 |
| 10,162,764 | B2 | 12/2018 | Bradbury et al. | |
| 10,977,192 | B1* | 4/2021 | Habusha | G06F 12/1027 |
| 2004/0025161 | A1* | 2/2004 | Chauvel | G06F 12/0891 711/E12.04 |
| 2013/0097360 | A1* | 4/2013 | Brandt | G06F 12/0804 711/6 |
| 2013/0124794 | A1 | 5/2013 | Bux et al. | |
| 2015/0301951 | A1* | 10/2015 | Bybell | G06F 12/145 711/207 |

(Continued)

OTHER PUBLICATIONS

U.S. Appl. No. 16/444,418, filed Jun. 18, 2019, entitled "Storage System and Method for Enabling Host-Driven Regional Performance in Memory."

(Continued)

*Primary Examiner* — John A Lane
(74) *Attorney, Agent, or Firm* — Crowell & Moring LLP

(57) ABSTRACT

A data storage device and method for application identifier handler heads-up for faster storage response are provided. In one embodiment, a data storage device is provided comprising a volatile memory, a non-volatile memory, and a controller. The controller is configured to: receive data and a logical address from a host, wherein the data is tagged with an identifier of an application on the host; store the data at a physical address in the non-volatile memory; maintain a logical-to-physical address table that comprises an entry associating the logical address, physical address, and identifier; determine that the application is subsequently reloaded on the host; and cache, in the volatile memory, a portion of the logical-to-physical address table that comprises the entry for the identifier. Other embodiments are provided.

19 Claims, 6 Drawing Sheets

(56) References Cited

U.S. PATENT DOCUMENTS

| | | |
|---|---|---|
| 2015/0347026 A1 | 12/2015 | Thomas |
| 2017/0004647 A1* | 1/2017 | Grossman ............. G06T 15/005 |
| | | 711/6 |
| 2017/0024326 A1 | 1/2017 | Luo et al. |
| 2017/0091125 A1* | 3/2017 | Adachi ............... G06F 12/1483 |
| 2017/0371789 A1* | 12/2017 | Blaner ............... G06F 12/0831 |
| 2018/0018095 A1* | 1/2018 | Lee .................... G06F 12/1009 |
| 2018/0060250 A1* | 3/2018 | Hildesheim ......... G06F 12/1483 |
| 2018/0150406 A1* | 5/2018 | John ................... G06F 12/1063 |
| 2018/0203806 A1* | 7/2018 | Moudgill ............ G06F 12/1009 |
| 2019/0294554 A1* | 9/2019 | Bryant ............... G06F 12/0846 |
| 2020/0272577 A1 | 8/2020 | Zeng et al. |
| 2021/0089411 A1* | 3/2021 | Prasad ................ G06F 12/109 |
| 2021/0109866 A1* | 4/2021 | Wu .................... G06F 12/1027 |

OTHER PUBLICATIONS

U.S. Appl. No. 16/899,992, filed Jun. 12, 2020, entitled "Storage System and Method for Enabling Partial Defragmentation."

\* cited by examiner

DATA STORAGE DEVICE AND METHOD FOR APPLICATION IDENTIFIER HANDLER HEADS-UP FOR FASTER STORAGE RESPONSE

BACKGROUND

A host can store data in a data storage device and later retrieve the data. When a host sends a read command with a logical address to the data storage device, the data storage device retrieves the relevant entries of a logical-to-physical address table to identify a physical address of the memory associated with the logical address.

DETAILED DESCRIPTION

Overview

Figure 1A:
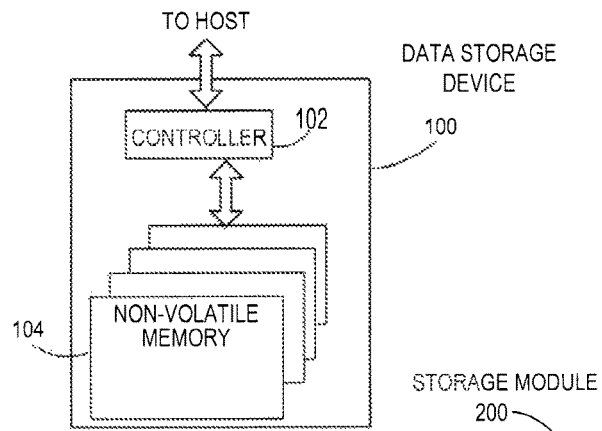
FIG. 1A is a block diagram of a data storage device of an embodiment.

By way of introduction, the below embodiments relate to a data storage device and method for application identifier handler heads-up for faster storage response. In one embodiment, a data storage device is provided comprising a volatile memory, a non-volatile memory, and a controller. The controller is configured to: receive data and a logical address from a host, wherein the data is tagged with an identifier of an application on the host; store the data at a physical address in the non-volatile memory; maintain a logical-to-physical address table that comprises an entry associating the logical address, physical address, and identifier; determine that the application is subsequently reloaded on the host; and cache, in the volatile memory, a portion of the logical-to-physical address table that comprises the entry for the identifier.

In some embodiments, the portion of the logical-to-physical address table is cached prior to receiving a storage command from the host that would otherwise cause the portion of the logical-to-physical address table to be cached.

In some embodiments, the controller is further configured to determine that the application is subsequently reloaded on the host by receiving the identifier from the host.

In some embodiments, the controller is further configured to determine that the application is subsequently reloaded on the host by determining that the application is being reloaded from the data storage device.

In some embodiments, the controller is further configured to deprioritize the portion of the logical-to-physical address table in response to receiving information from the host that the application is retired.

In some embodiments, the controller is further configured to make an exception to a swap-out policy for the cached portion of the logical-to-physical address table.

In some embodiments, the controller is further configured to store data from different applications in different logical regions of the non-volatile memory.

In some embodiments, the controller is further configured to store data from different applications in different non-volatile memories.

In some embodiments, the data storage device is configured to be integrated in the host.

In some embodiments, the data storage device is configured to be removably connected with the host.

In some embodiments, the memory comprises a three-dimensional memory.

In another some embodiment, a method is provided that is performed in a data storage device comprising a volatile memory and a non-volatile memory. The method comprises: receiving data and a logical address from a host, wherein the data is tagged with an application identifier; maintaining an association between the logical address and the application identifier; receiving the application identifier from the host; and pre-loading, in the volatile memory, a portion of a control page associated with the application identifier (and, thus, the data of the corresponding application).

In some embodiments, the portion of the control page is pre-loaded prior to receiving a storage command from the host that would otherwise cause the portion of the control page to be loaded.

In some embodiments, the method further comprises deprioritizing the portion of the control page in response to information received from the host.

In some embodiments, the method further comprises making an exception to a swap-out policy for the pre-loaded portion of the control page.

In some embodiments, the method further comprises storing data from different host applications in different logical regions of the non-volatile memory.

In some embodiments, the method further comprises storing data from different applications in different non-volatile memories in the data storage device.

In some embodiments, the method further comprises observing memory access patterns of an application running on the host.

In some embodiments, the method further comprises associating logical data with an application based on the observed memory access patterns.

In another embodiment, a data storage device is provides comprising: a memory; means for maintaining an association between a logical address and an application identifier received from a host in a write command; and means for pre-loading a page of a logical-to-physical address table from the memory in response to receiving the application identifier from the host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
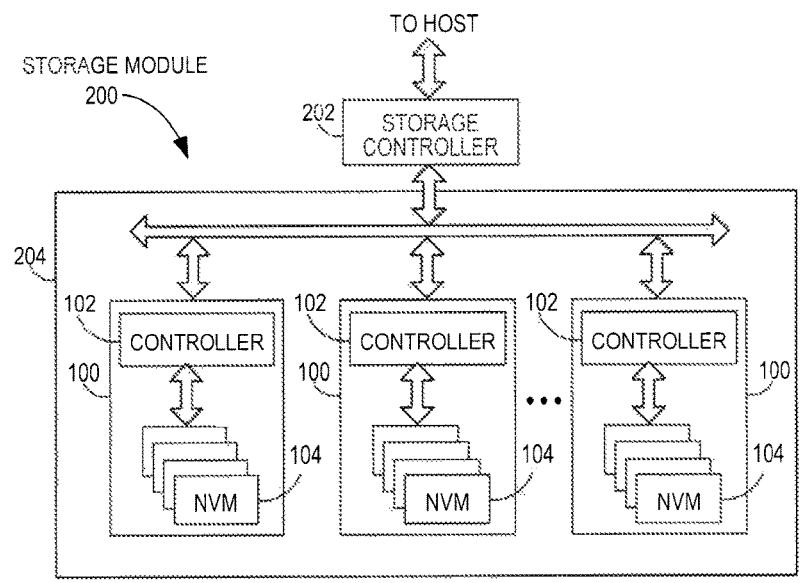
FIG. 1B is a block diagram illustrating a storage module of an embodiment.
Figure 1C:
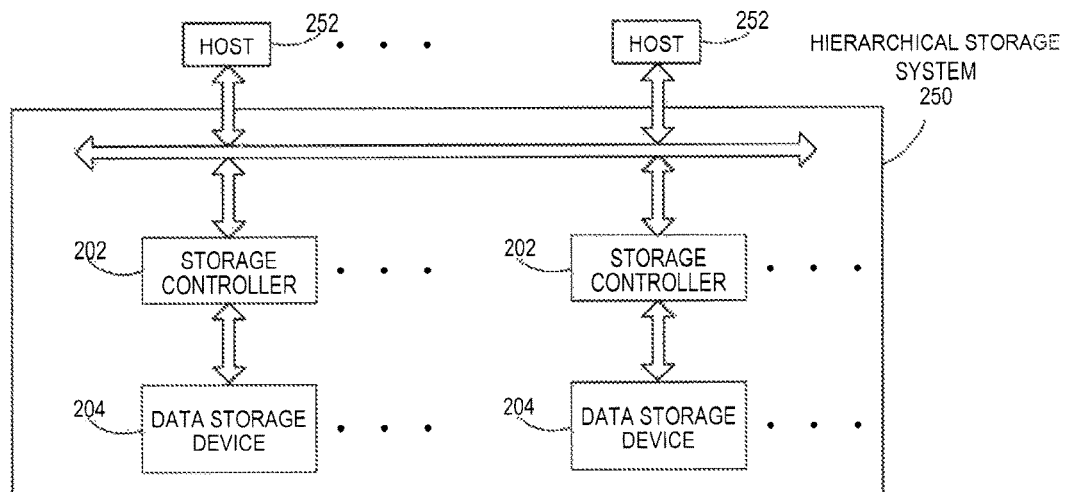
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
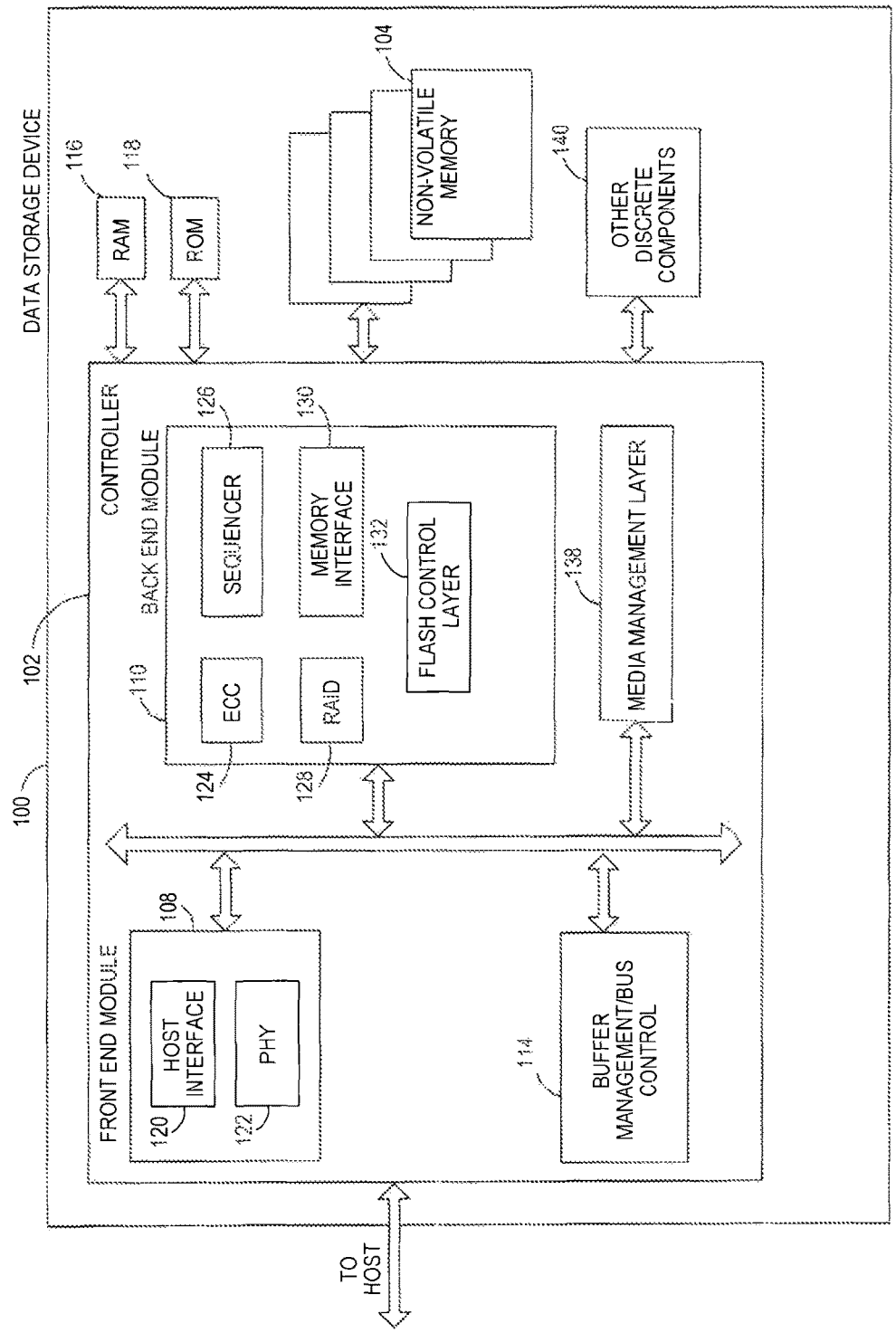
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
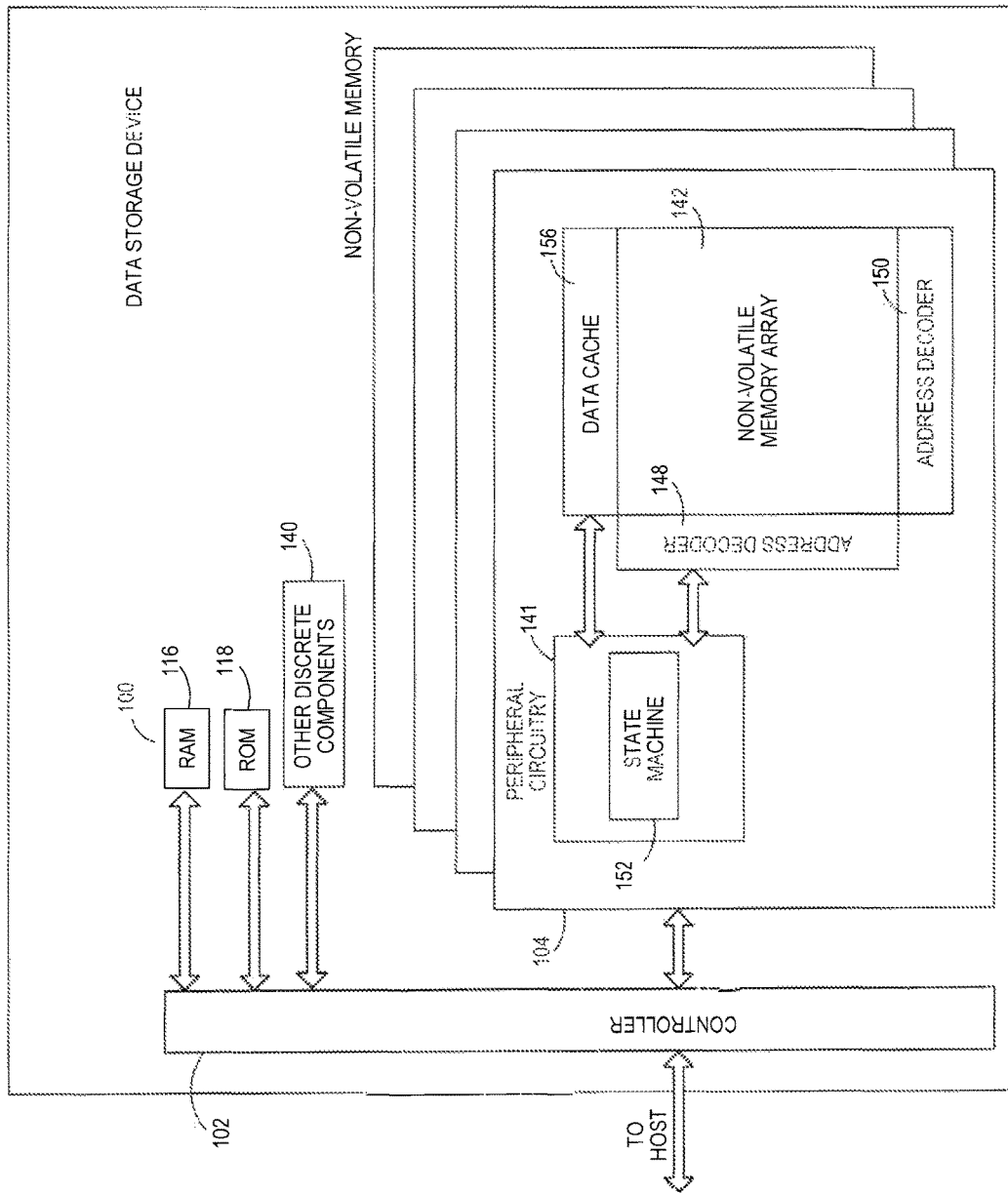
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
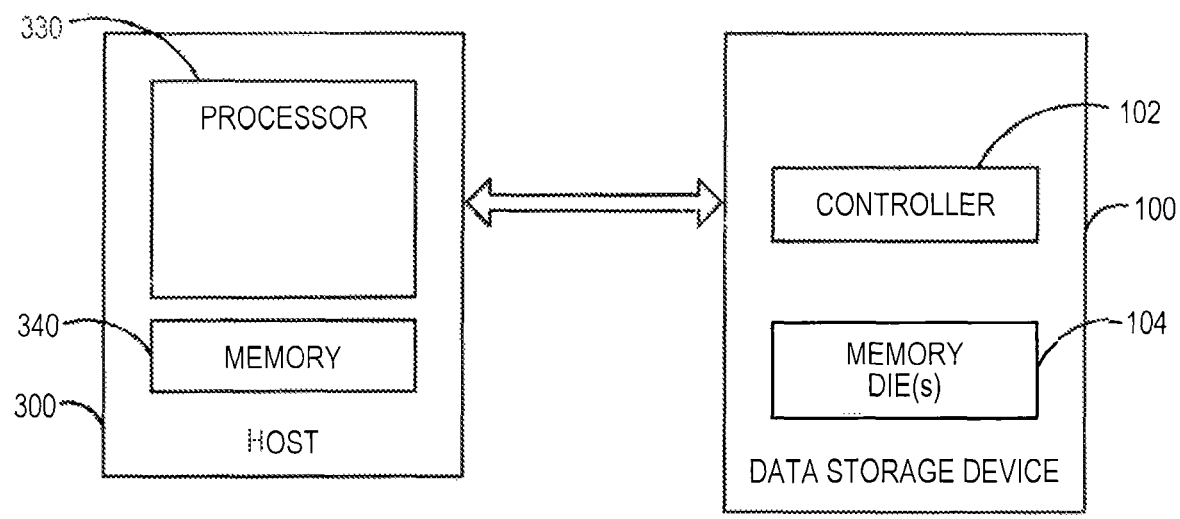
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

As mentioned above, when a host sends a storage (e.g., read/write) command with a logical address (e.g., a logical block address (LBA)) to a data storage device, the data storage device retrieves the relevant entries of a logical-to-physical ("L2P") address table to identify a physical address of the memory identified with the logical address. The retrieval of these table entries can slow the response time of the data storage device. The following embodiments can be used to avoid this reduced response time by proactively caching ("swapping in") the entries prior to receiving the storage command from the host. This device-side control-page optimization can be based on host feedback, leading to proactive logical-to-physical entry swap-in prior to receiving a storage command from the host.

In one embodiment, various applications on the host 300 each have their own unique identifiers, and the host 300 tags data sent to the data storage device 100 for storage with an application identifier (ID) of the application that generated the data. When the data storage device 100 receives and stores the data in the memory 104, the controller 102 in the data storage device 100 associates the stored data (sometimes referred to herein as the input-output (IO) data) with the application that generated the data by tagging the logical data with the host-provided application ID. Further, the controller 102 can maintains an application-ID-to-logical-data mapping alongside typical logical-to-physical address mapping, which can be stored in the memory 104.

Figure 4:
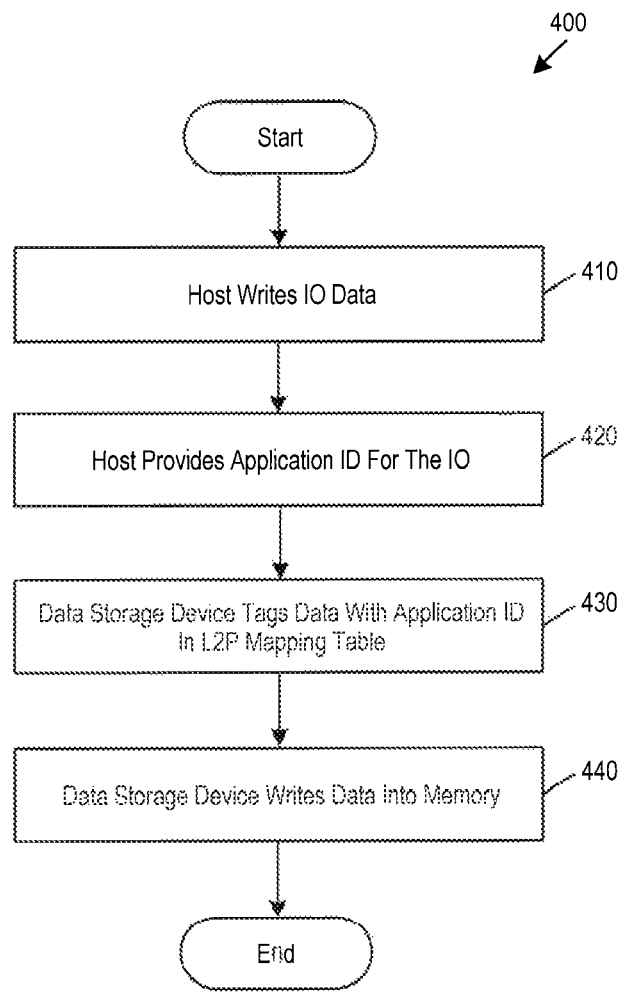
FIG. 4 is a flow chart of a method of an embodiment for host application identifier tagging during an input-output operation.

FIG. 4 is a flow chart 400 that illustrates this process. As shown in FIG. 4, when the host 300 writes input-output data to the data storage device 100 (act 410), the host 300 provides the data storage device 100 with an identifier for the input-output operation (act 420). In one embodiment, the identifier is a unique identifier for the application on the host 300 (or on another device) that generated the data. The data storage device 100 tags the data with the application identifier in the logical-to-physical address table (act 430) and writes the data in the non-volatile memory 104 (act 440). It should be noted that, in other embodiments, the controller 102 may tag differently and use the L2P association separately, although tagging to the L2P table is easily implementable.

When that application is subsequently re-loaded on the host 300, the host 300 provides a heads-up to the data storage device 100 (e.g., by sending the application ID associated with that application). Using the host-provided application ID, the controller 102 can identify the tagged logical data for that application ID (e.g., using the mapping discussed above) and pre-load the pages of the logical-to-physical address map associated with that logical data (sometimes referred to herein as "control pages") in a cache (e.g., any suitable volatile memory in the data storage device 100). This results in the pre-loading of logical-to-physical pages for the logical regions of IO data associated with the application ID. These pages are "pre-loaded" in the sense that they are cached before the host 300 issues a storage command with a logical address to the data storage device 100, which is when the data storage device 100 would typically be informed of the logical address. By the host 300 providing the data storage device 100 with this heads-up and the data storage device 100 pre-loading the mapping entries, these embodiments provide for a faster response to a host storage command because the time-consuming act of loading the mapping entries has occurred before the command is received.

Figure 5:
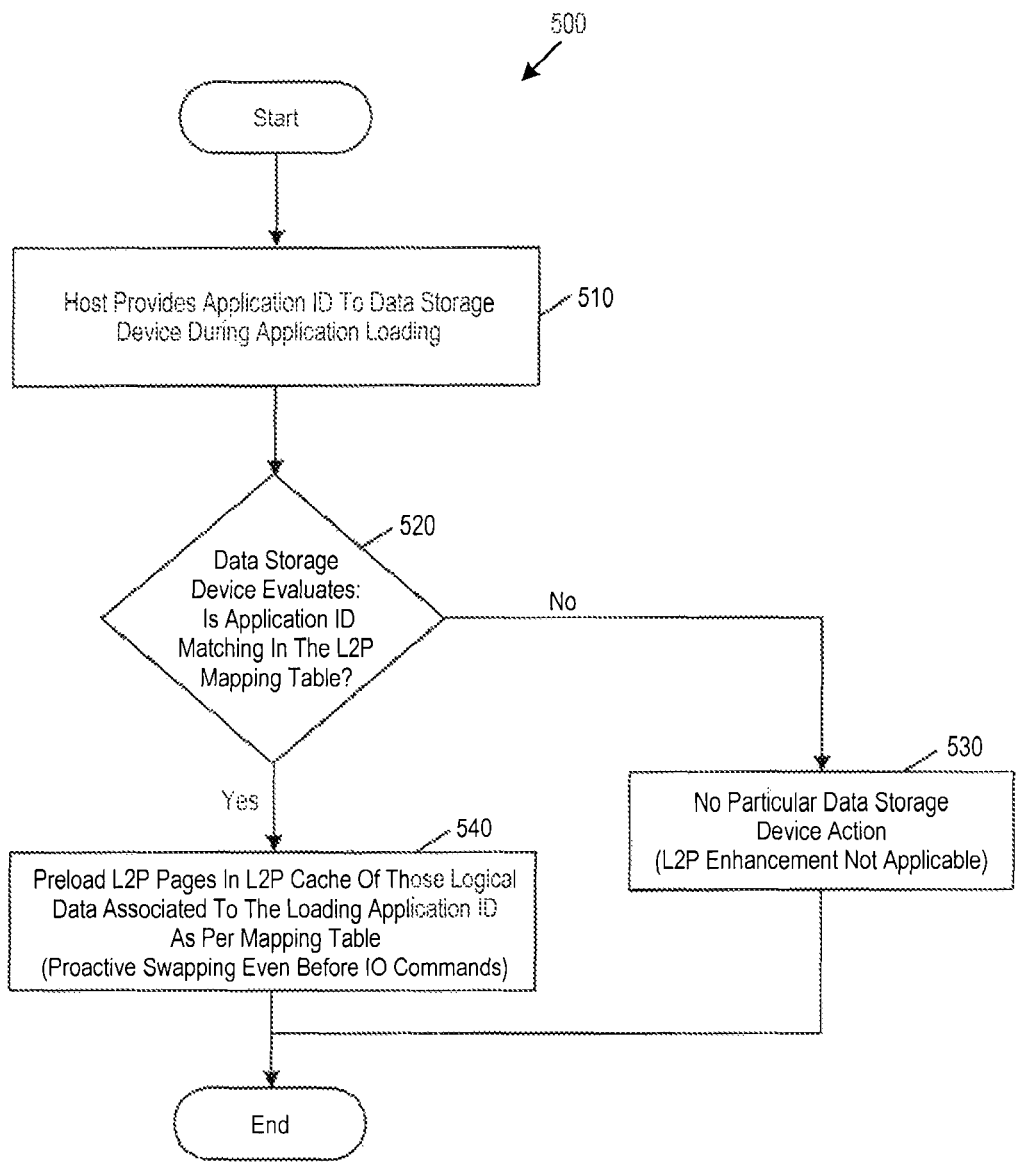
FIG. 5 is a flow chart of a method of an embodiment for a data storage device processing a host heads-up on application loading.

FIG. 5 is a flow chart 500 that illustrates this process. As shown in FIG. 5, the host 300 provides an application identifier to the data storage device 100, which occurs in this embodiment during the application loading process on the host 300 (act 510). The data storage device 100 evaluates whether the application identifier received from the host 300 matches an application identifier stored in the logical-to-physical address table in the non-volatile memory 104 (act 520). If no match occurs, no special action is taken with respect to the enhancement mentioned in this embodiment (act 530). However, if a match occurs, the controller 102 pre-loads the page(s) of the logical-to-physical address table that contain the application identifier and caches those page(s) in volatile memory in the data storage system 100 (e.g., in the controller 102 or elsewhere) (act 540). In this way, the controller 102 performs proactive swapping even before the read IO command is received from the host 300.

These embodiments can be used in any suitable context. For example, these embodiments can be used when a user (or autonomous vehicle) switches on a camera or other sensor. In that situation, the host 300 (e.g., the autonomous vehicle) provides information to the data storage device 100 about the application, and the controller 102 in the data storage device 100 pre-loads control pages according to the IO space allocated for the camera or sensor application. Again, by being pre-loaded, the control pages are cached prior to receiving a logical address in a read/write command from the host 300. Of course, autonomous vehicles are merely one example implementation of these embodiments. Other examples include applications, such as WhatsApp and Amazon Video, where the application and the related IO are stored in different logical regions or in different data storage device.

The following is an example use case of these embodiments. Consider the situation in which there are five applications running in the host 300. Application 2 and 4 are loading currently, and Applications 1, 3, and 5 are not running or are not currently loading. LBA a-b and LBA x-y are associated with Applications 2 and 4, respectively, as per initial host tagging during data writes or according to application-to-namespace mapping. A data storage device may have equal sharing of logical-to-physical address mapping cache for all its logical capacity without any heads up. In contrast, with these embodiments, since only two applications are running and the host 300 has provided the heads-up to the data storage device 100, the data storage device 100 can run reverse mapping logic. That is, the data storage device 100 can determine the Application→LBA mapping from the stored logical-to-physical ("L2P") metadata entry and pre-load the entire L2P cache with L2P pages corresponding to logical regions LBA a-b and LBA x-y, even before receiving any storage commands from the host 300 for those applications. Such a heads-up mechanism improves the immediate response to initial storage commands, as well as enhances subsequent L2P swap-in and swap-out logic in the data storage device 100.

There are many alternatives that can be used with these embodiments. For example, once an application is retired in the host 300 (e.g., exited or not in an active state), the host 300 can provide this feedback to the data storage device 100. In response, the data storage device 100 can use this information to prioritize a swap-out of those L2P control pages associated with the logical regions used by the retiring application. This provides room in the volatile memory for pre-loading L2P pages of the other running applications. With reference to the above use case example, if the data storage device 100 is informed that Application 2 is retired, the controller 102 in the data storage device 100 can prioritize L2P pages of Application 2 for swap-out whenever a new page has to be loaded in the data storage device 100 for already-running Application 4, rather than swapping-out another L2P page already associated with Application 4. During swap-in and swap-out, the control pages can be saved from a memory swap-out policy if the data storage device 100 determines that the logical blocks belong to the running applications. The host feedback may be required if the IO is managed separately from the executables (e.g., if eMMC is used for the applications, and an external Secure Digital (SD) memory card is used for IO) to override the typical need-based allocation policy (storage commands in a submission queue).

In another alternative, if the application loads from the same non-volatile memory device as that of IO, the data storage device 100 can proactively cache the L2P pages associated to the IO regions of the loading applications, not depending on host feedback. The data storage device 100 can perform learning from access patterns of various applications and associate relevant logical data to the application executables. In this case, the data storage device 100 proactively loads the L2P pages of IO-associated logical addresses at the time the application is loaded, without host feedback. In this way, instead of the application/host 300 tagging the data, the data storage device 100 can tag the application/host ID to bias IO data based on different applications/hosts.

Further, embodiments that enable faster response for serving any storage command for the applications running in the host can be used alone or in conjunction with other device-side enhancements based on specific application requirements to improve the quality of service of the overall system. For example, U.S. patent application Ser. No. 16/444,418, which is hereby incorporated by reference, discusses how storage resources can be biased according to NVMe-defined performance regions. These embodiments can improve the efficiency of the host since applications that are marked for superior logical regions benefit from the biased resources in the data storage device. As another example, U.S. patent application Ser. No. 16/899,992, which is hereby incorporated by reference, discusses how a data storage device can defragment a portion of data of certain applications (certain logical regions) based on host requests for burst retrieval. The controlled data defragmentation allows the device to reap benefit out of the generated backend workload.

Finally, as mentioned above, any suitable type of memory can be used.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a volatile memory;
    a non-volatile memory; and
    a controller configured to:
        receive, from a host, data, an identifier of an application on the host that generated the data, and a logical address;
        store the data at a physical address in the non-volatile memory;
        store, in a logical-to-physical address table, an entry that maps the logical address, the physical address, and the identifier;
        determine that the application is subsequently reloaded on the host by receiving from the host, the identifier of the application; and
        prior to receiving, from the reloaded application, a read command with the logical address, cache, in the volatile memory, a portion of the logical-to-physical address table that comprises the entry, wherein the portion of the logical-to-physical address table is not cached in the volatile memory when the application is subsequently reloaded on the host.

2. The data storage device of claim 1, wherein the portion of the logical-to-physical address table is cached prior to receiving, from the host, a storage command that would otherwise cause the portion of the logical-to-physical address table to be cached.

3. The data storage device of claim 1, wherein the controller is further configured to deprioritize the portion of the logical-to-physical address table in response to receiving information from the host that the application is retired.

4. The data storage device of claim 1, wherein the controller is further configured to make an exception to a swap-out policy for the cached portion of the logical-to-physical address table.

5. The data storage device of claim 1, wherein the controller is further configured to store data from different applications in different logical regions of the non-volatile memory.

6. The data storage device of claim 1, wherein the controller is further configured to store data from different applications in different non-volatile memories.

7. The data storage device of claim 1, wherein the data storage device is configured to be integrated in the host.

8. The data storage device of claim 1, wherein the data storage device is configured to be removably connected with the host.

9. The data storage device of claim 1, wherein the non-volatile memory comprises a three-dimensional memory.

10. The data storage device of claim 1, wherein the controller is further configured to observe memory access patterns of the application.

11. The data storage device of claim 10, wherein the controller is further configured to associate logical data with the application based on the observed memory access patterns.

12. A method comprising:
    performing the following in a data storage device comprising a volatile memory and a non-volatile memory:
        receiving, from a host, data, an identifier of an application on the host that generated the data, and a logical address;
        storing, in a logical-to-physical address table, an entry that maps the logical address, a physical address, and the identifier;
        determining that the application is subsequently reloaded on the host by receiving, from the host, the identifier of the application; and
        prior to receiving, from the reloaded application, a read command with the logical address, pre-loading, in the volatile memory, a portion of the logical-to-physical address table that comprises the entry, wherein the portion of the logical-to-physical address table is not cached in the volatile memory when the application is subsequently reloaded on the host.

13. The method of claim 12, wherein the portion of the logical-to-physical address table is pre-loaded prior to receiving a storage command from the host that would otherwise cause the portion of the logical-to-physical address table to be loaded.

14. The method of claim 12, further comprising making an exception to a swap-out policy for the pre-loaded portion of the logical-to-physical address table.

15. The method of claim 12, further comprising storing data from different host applications in different logical regions of the non-volatile memory.

16. The method of claim 12, further comprising storing data from different applications in different non-volatile memories in the data storage device.

17. The method of claim 12, further comprising observing memory access patterns of the application.

18. The method of claim 17, further comprising associating logical data with the application based on the observed memory access patterns.

19. A data storage device comprising:
    a memory;
    means for storing, in a logical-to-physical address table, an entry that maps a logical address, a physical address, and an identifier of an application on a host that generated data;
    means for determining that the application is subsequently reloaded on the host by receiving, from the host, the identifier of the application; and means for pre-loading a portion of the logical-to-physical address table that comprises the entry prior to receiving, from the reloaded application, a read command with the logical address, wherein the portion of the logical-to-physical address table is not cached in a volatile memory when the application is subsequently reloaded on the host.

* * * * *